United States Patent
Dazet et al.

(10) Patent No.: US 9,764,816 B2
(45) Date of Patent: Sep. 19, 2017

(54) SLIDING CONNECTION BETWEEN THE FLOOR STRUCTURE AND THE HULL STRUCTURE OF AN AIRCRAFT

(71) Applicant: Airbus Operations (SAS), Toulouse (FR)

(72) Inventors: Francis Dazet, Tournous Darre (FR); Jerome Antypas, Plaisance du Touch (FR); Laurent Bel, Gagnac sur Garonne (FR); Philippe Delorme, Plaisance du Touch (FR); Raphael Brisbart, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 14/724,080

(22) Filed: May 28, 2015

(65) Prior Publication Data

US 2015/0344119 A1 Dec. 3, 2015

(30) Foreign Application Priority Data

May 30, 2014 (FR) ...................................... 14 54912

(51) Int. Cl.
    *B64C 1/06* (2006.01)
    *C09J 5/00* (2006.01)
    *B64C 1/18* (2006.01)

(52) U.S. Cl.
    CPC ............. *B64C 1/069* (2013.01); *B64C 1/062* (2013.01); *B64C 1/18* (2013.01); *C09J 5/00* (2013.01); *Y10T 29/49623* (2015.01)

(58) Field of Classification Search
    CPC B64C 1/062; B64C 1/069; B64C 1/18; B64C 1/20; E04B 5/10; E04B 9/122; E04C 2/38; E04C 2/08; E04C 3/205

(Continued)

(56) References Cited

U.S. PATENT DOCUMENTS 2,113,692 A * 4/1938 Hughes ................. B64D 37/04
    244/131
6,065,267 A * 5/2000 Fisher ....................... E04C 3/08
    52/655.1

(Continued)

FOREIGN PATENT DOCUMENTS

AU      41660/72    * 2/1972
CA      2820670 A1 * 12/2013

(Continued)

OTHER PUBLICATIONS

French Search Report, Feb. 10, 2015.

*Primary Examiner* — Christopher P Ellis
*Assistant Examiner* — Magdalena Topolski
(74) *Attorney, Agent, or Firm* — Greer, Burns & Crain, Ltd.

(57) ABSTRACT

An aircraft structure part comprising a floor structure, a hull structure, and a connecting element. The connecting element comprises a rod attached, at its first end, to one of the hull and the floor; an attachment element, attached to the other of the hull and the floor, and provided with an opening in which the second end of the rod is slidably mounted; and an endstop attached to the rod so as to engage with the attachment element, to limit the sliding amplitude of the rod in the opening. When the connection between the floor and the hull is loaded in tension, the endstop makes it possible to comply with the standards for withstanding acceleration towards the aircraft front. When the connection is loaded in compression, the rod slides freely in the opening, which limits the constraints of withstanding compressive stresses, reducing the weight of the connecting element.

14 Claims, 5 Drawing Sheets

(58) Field of Classification Search
USPC ....... 244/119, 131; 52/713, 655.1, 664, 665,
52/653.1, 245, 247
See application file for complete search history.

(56) References Cited

U.S. PATENT DOCUMENTS

| | | | |
|---|---|---|---|
| 7,874,516 B2* | 1/2011 | Cacciaguerra | B64C 1/061 |
| | | | 244/119 |
| 9,487,285 B2* | 11/2016 | Goehlich | B64C 1/061 |
| 9,517,829 B2* | 12/2016 | Fink | B64C 1/061 |
| 2009/0236472 A1 | 9/2009 | Wood | |
| 2010/0001134 A1* | 1/2010 | Braeutigam | B64C 1/068 |
| | | | 244/119 |
| 2010/0044510 A1 | 2/2010 | Schroeer et al. | |
| 2010/0230535 A1* | 9/2010 | Huber | B64C 1/18 |
| | | | 244/118.1 |
| 2014/0291447 A1* | 10/2014 | Goehlich | B64C 1/18 |
| | | | 244/119 |
| 2016/0129986 A1* | 5/2016 | Anast | B64C 1/069 |
| | | | 244/119 |
| 2016/0144944 A1* | 5/2016 | Goings | B64D 11/0023 |
| | | | 244/129.5 |

FOREIGN PATENT DOCUMENTS

| | | |
|---|---|---|
| DE | 102006019123 | 10/2007 |
| DE | 102010014638 A1 * | 10/2011 |
| WO | 2007033640 | 3/2007 |
| WO | WO 2009101372 A1 * | 8/2009 |

\* cited by examiner

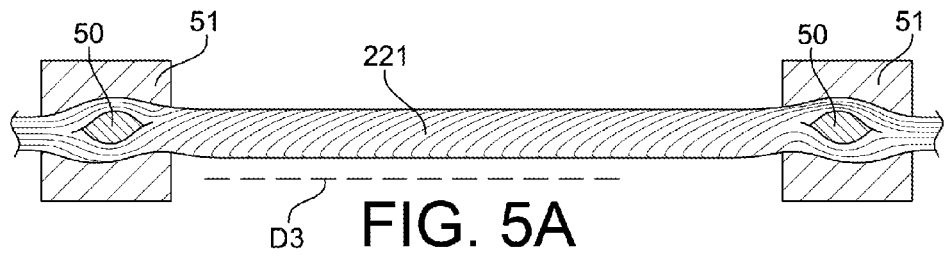
FIG. 5A
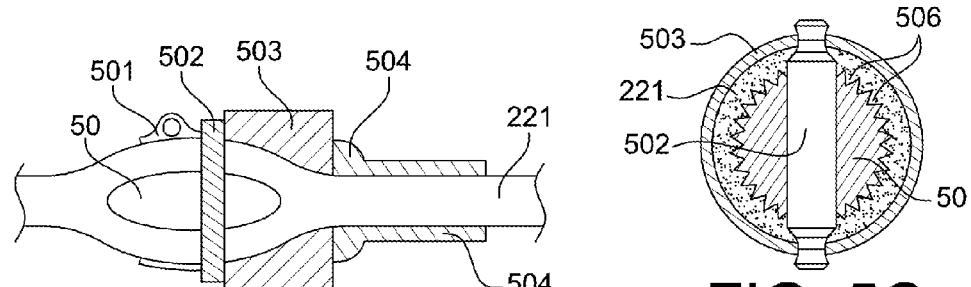
FIG. 5B
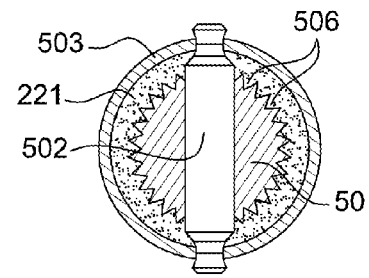
FIG. 5C
FIG. 5D
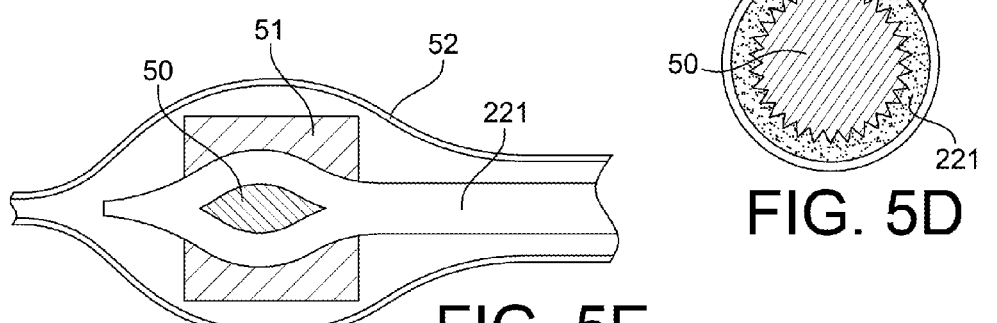
FIG. 5E
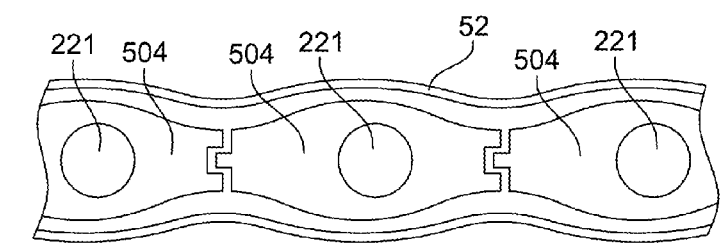
FIG. 5F

SLIDING CONNECTION BETWEEN THE FLOOR STRUCTURE AND THE HULL STRUCTURE OF AN AIRCRAFT

CROSS-REFERENCES TO RELATED APPLICATIONS

This application claims the benefit of the French patent application No. 14 54912 filed on May 30, 2014, the entire disclosures of which are incorporated herein by way of reference.

BACKGROUND OF THE INVENTION

The present invention relates to the field of the connection between the floor structure and the hull structure, in an aircraft.

The structure 10 of an aircraft comprises in particular the hull structure and the floor structure. FIG. 1 shows an example of a connection according to the prior art, between a hull structure 11 and a floor structure 12.

An orthonormal reference system (Oxyz) is defined.

The axis Ox corresponds to the longitudinal axis Ox of the aircraft. The front and the rear of the aircraft are defined along this axis Ox. The front of the aircraft corresponds to the nose of the aircraft, where the cockpit is located. The rear of the aircraft corresponds to the tail of the aircraft, where the vertical stabilizer is generally located. In what follows, it is assumed that, in normal flight conditions, the aircraft moves along the axis Ox, along a vector oriented from the rear towards the front of the aircraft.

The axis Oz corresponds to the vertical axis, when the aircraft is on the ground, in the parking position.

The axis Oy defines with the axis Ox a horizontal plane, when the aircraft is on the ground, in the parking position. The axis Oy corresponds to the transverse axis of the aircraft.

The hull structure 11 comprises in particular a set of frames 11A, forming stiffeners which are transverse relative to the axis Ox, and a set of stringers 11B, forming longitudinal stiffeners parallel to the axis Ox. The hull structure also comprises one or more metal or composite sheets shaped according to the desired profile, and termed skin 11C. The skin 11C covers the mesh formed by the frames 11A and the stringers 11B.

The floor structure 12 comprises a set of crosspieces 12A and rails 12B. The rails 12B extend along the axis Ox, and serve for the attachment of furniture elements such as the seats. The rail 12C is an external rail, that is to say, a rail close to the hull structure, or in other words, close to the sidewalls of the aircraft. The crosspieces 12A extend along the axis Oy.

In the example shown in FIG. 1, the floor structure 12 is pressed against the hull structure 11 via the intermediary of stanchions 13 extending along the axis Oz.

In order to stabilize the floor structure 12, anti-crash connecting rods 14 extend in the plane (xOy). Each anti-crash connecting rod is an elongate rigid component, mounted fixed, at each one of its ends, to the floor structure on one hand, and to the hull structure on the other hand. In the example shown in FIG. 1, each anti-crash connecting rod 14 is attached at a first point 14A, to the external rail 12C, and at a second point 14B to a stringer 11B. The first point 14A is located close to the intersection between the external rail 12C and a crosspiece 12A. The second point 14B is located close to the intersection between a stringer 11B and a frame 11A. Each anti-crash connecting rod 14 extends diagonally, inclined relative to the axis Ox.

The anti-crash connecting rods 14 make it possible to hold the floor structure 12 substantially fixed relative to the hull structure 11, even in the event of sharp deceleration of the aircraft, and in particular in the event of the aircraft crashing. A crash can be either a crash proper or an abrupt landing of the aircraft, or an impact which approaches an abrupt landing in respect of the forces. In such a situation, the inertial force of the floor structure tends to move it away from the hull structure. In particular, the anti-crash connecting rods must be able to withstand an acceleration equal to 9 g along the axis Ox, towards the front of the aircraft (where g is the gravity of earth, equal to approximately 9.8 m/s−2). The force which acts on the anti-crash connecting rods is proportional to this acceleration and to the mass of the floor structure and the loads supported by the latter (furniture of the aircraft, passengers, etc.). In order to withstand such an acceleration, the anti-crash connecting rods have very large cross sections, and therefore a very high mass. An acceleration towards the front of the aircraft may also be called "deceleration."

SUMMARY OF THE INVENTION

One object of the present invention is to propose a solution for connecting the floor structure and the hull structure, which makes it possible to reduce the total mass of the aircraft, while still fulfilling the requirements of withstanding an acceleration of 9 g towards the front of the aircraft.

This object is achieved with an aircraft structure part comprising a floor structure portion, a hull structure portion, and a connecting element.

According to the invention, the connecting element comprises:

a rod attached, at its first end, to one among the hull structure portion and the floor structure portion;

an attachment element, attached to the other among the hull structure portion and the floor structure portion, and provided with an opening in which the second end of the rod is mounted such that it can slide along its longitudinal axis; and an endstop element attached to the rod, arranged so as to engage with the attachment element so as to limit the sliding amplitude of the rod in the opening.

In flight, the sliding is limited by the endstop element when the connecting element is loaded in tension, and is not limited by an endstop when this element is loaded in compression. The endstop element thus defines a maximum distance between the hull structure portion and the floor structure portion. The minimum distance is not defined by an endstop, but simply by maximum compressive stresses applied to the connecting element during flight. These maximum stresses are defined in a set of specifications of the aircraft, which satisfies standards establishing all of the maximum compressive and tensile stresses to which an aircraft must be able to be subjected.

In particular, when the connection between the hull structure portion and the floor structure portion is loaded in tension (deceleration of the aircraft), the rod slides, where relevant, in the opening, then the sliding is blocked by the endstop element. In this position, the connecting element according to the invention makes it possible to satisfy the current standards for withstanding a deceleration of 9 g towards the front of the aircraft.

When the connection between the hull structure portion and the floor structure portion is loaded in compression (for example, lateral bending load), the rod slides in the opening without the sliding being blocked by the endstop element.

By virtue of this free sliding, the rod does not need to be sufficiently solid to withstand a compressive load. On the contrary, in the prior art, the use of a rigid anti-crash connecting rod mounted fixed to the floor structure and to the hull structure, requires that this connecting rod be able to withstand the compressive stresses in order to avoid buckling phenomena (instability of a structure which, when loaded in compression, tends to bend perpendicular to the axis of compression).

Thus, the connecting element according to the invention can have a smaller mass, in comparison with an anti-crash connecting rod according to the prior art.

Thus, a connection is established between the floor structure and the hull structure, by means of which it is possible to reduce the total mass of the aircraft, while fulfilling the requirements of withstanding an acceleration of 9 g towards the front of the aircraft. For example, the mass of the means for connecting the floor structure and the hull structure is reduced by 20% by using a connecting element according to the invention instead of an anti-crash connecting rod according to the prior art. The total gain in mass is approximately 15 kg per use of a connecting element according to the invention. This gain can be increased by a further 9 kg approximately, by virtue of a rod made of composite material.

It can be considered that the invention comprises replacing connection means having a high compressive modulus, for example of the order of 70 000 MPa, with connection means having a very low compressive modulus (less than or equal to 100 MPa).

According to a first embodiment, the rod is attached, at its first end, to the hull structure portion, and the attachment element is attached to the floor structure portion.

According to this first embodiment, the attachment element may be attached to an external rail of the floor structure portion.

Preferably, according to this first embodiment, the rod is attached to a frame and a skin of the hull structure portion.

According to the invention, the endstop element is advantageously a nut screwed around the rod.

The endstop element may have a rectangular cross section, in a plane orthogonal to the longitudinal axis of the rod.

According to one advantageous embodiment, the attachment element comprises a recess in which is created the opening and which receives the endstop element, the endstop element being guided in translation within the recess when the rod slides through the opening.

According to this advantageous embodiment, the recess advantageously has an internal wall with a U-shaped cross section.

The structure part according to the invention preferably comprises a coating made of elastomeric material, attached to internal sidewalls of the recess or to external sidewalls of the endstop element.

The structure part according to the invention advantageously comprises a coating made of elastomeric material extending in a plane orthogonal to the longitudinal axis of the rod, on an internal wall of the recess, this wall surrounding the opening.

According to one variant of this advantageous embodiment, the attachment element extends between the first end of the rod and the endstop element.

Preferably, the rod is inserted, at its first end, into an opening created in an intermediate component attached to one among the hull structure portion and the floor structure portion, the rod being held secured to the intermediate component by two nuts positioned around the rod on either side of said opening.

As a variant, the first end of the rod may be pressed against the bottom of an indentation in an intermediate component, by a clip extending transversely to the rod, the clip being attached on either side of the rod to one among the hull structure portion and the floor structure portion.

According to another variant, the first end of the rod may be pressed against an internal face of an orifice created in an intermediate component, by a clip extending transversely to the rod, the clip being attached on just one side of the rod to one among the hull structure portion and the floor structure portion.

The invention also relates to a method for manufacturing a rod according to the invention, the method comprising the following steps:

forming a bundle of fibers, such that at each end of said bundle, a spacer is interposed between the fibers;

at each end of said bundle of fibers, positioning a clamping component around an assembly formed by the fibers and the spacer;

applying resin to the bundle of fibers; and polymerizing the resin to form, between the spacers, a rod made of composite material.

BRIEF DESCRIPTION OF THE DRAWINGS

The present invention will be better understood upon reading the description of exemplary embodiments which are given purely by way of indication and are in no way limiting, with reference to the appended drawings, in which:

FIGS. 5A to 5F show a method according to the invention, for manufacturing a rod of an aircraft structure part according to the invention.

DETAILED DESCRIPTION OF THE PREFERRED EMBODIMENTS

Figure 1:
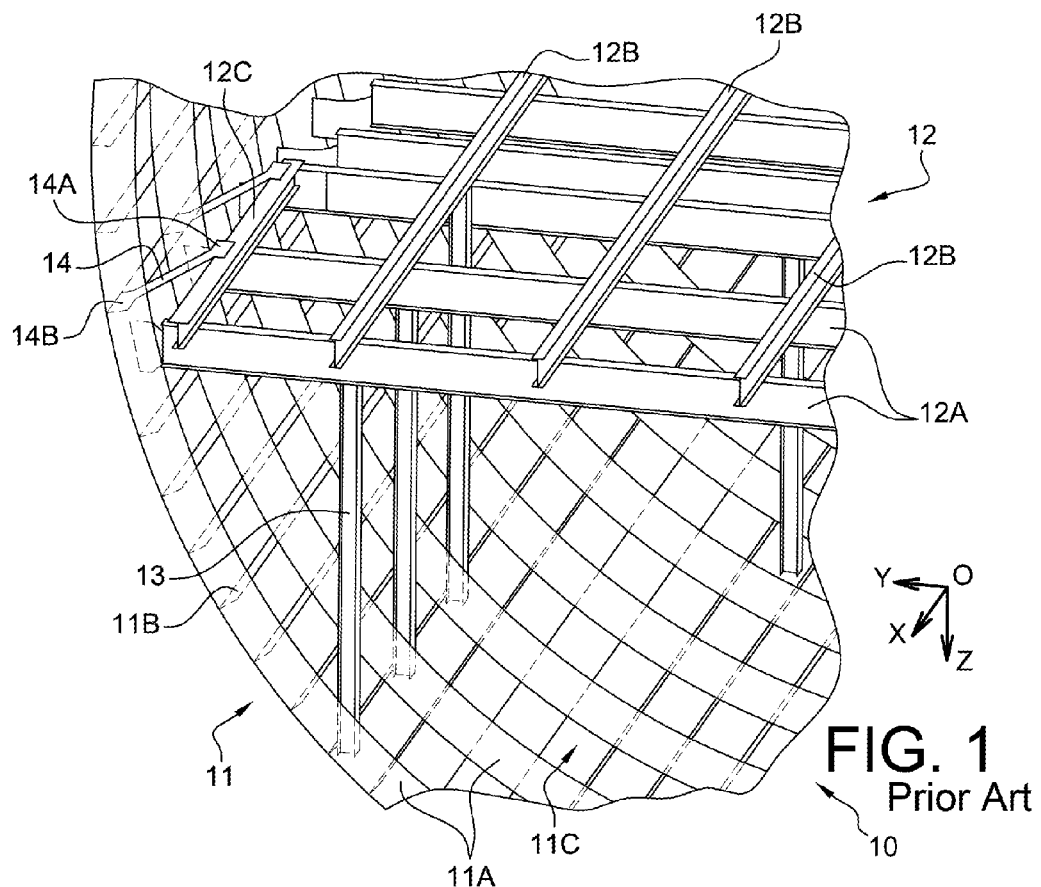
FIG. 1 shows, schematically, an aircraft structure part according to the prior art.
Figure 2A:
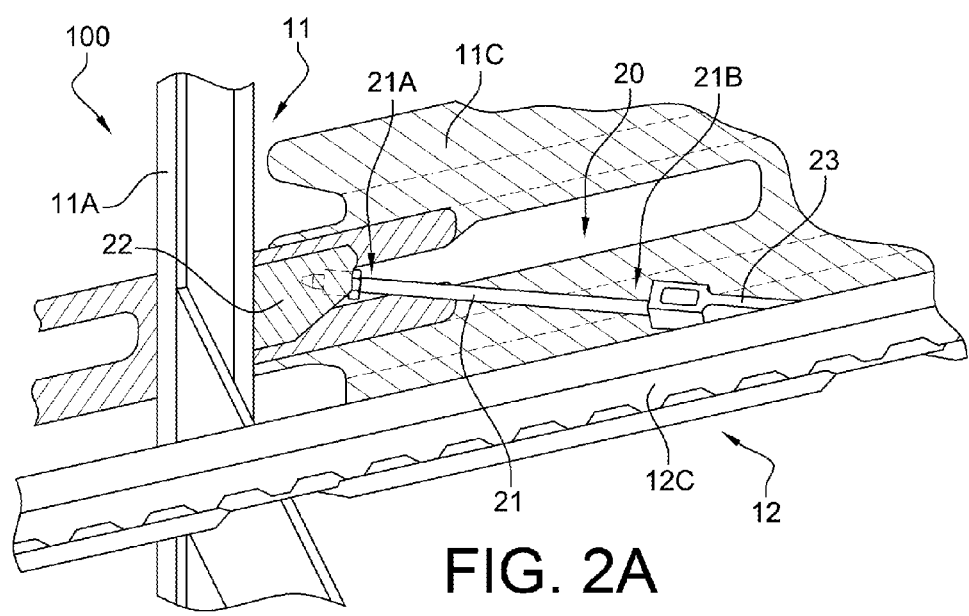
FIG. 2A shows a first embodiment of an aircraft structure part according to the invention.

FIG. 2A shows a floor structure portion 12, that is to say, part of a floor structure. FIG. 2A shows in particular a detail view of an external rail 12C of the floor structure 12. FIG. 2A also shows a hull structure portion 11, that is to say, part of a hull structure. FIG. 2A shows in particular a detail view of a frame 11A and of a skin 11C. A connecting element 20 according to the invention connects the floor structure portion and the hull structure portion.

The connecting element 20 comprises a rod 21. The rod 21 may be made of metal, for example aluminum, titanium or steel. Aluminum is advantageously used for its low density, or stainless steel for its resistance to corrosion. As a variant, the rod 21 is made of composite material, comprising for example threads of carbon or of poly(paraphenylene terephthalamide) (Kevlar®). The rod 21 may also comprise fibers connected in a flexible manner, and placed in a rigid sheath, for example made of steel. The rod has a cylindrical shape. The diameter of the rod may be between 10 mm and 50 mm, for example 13 mm, or 10 mm. The length of the rod may be between 400 mm and 600 mm, for example 470 mm.

The rod 21 extends in the plane (yOx) such as defined in the introduction. One could nonetheless envisage a component along the axis Oz. The rod 21 is placed diagonally relative to the axes Ox and Oy, for example at an angle between 20° and 80° relative to the axis Ox. This angle is less than 90°. That end of the rod which is connected to the hull structure is located towards the front of the aircraft, whereas that end of the rod which is connected to the floor structure is located towards the rear of the aircraft.

The rod 21 is attached, at its first end 21A, to the hull structure portion 11. "Attached to an element" is to be interpreted as "fixed relative to this element." Here, the first end 21A of the rod is fixed relative to the hull structure. In particular, the end 21A of the rod 21 is attached, with the aid of an intermediate component 22, both to the frame 11A and to the skin 11C.

The connecting element 20 also comprises an attachment element 23, attached to the floor structure portion 12. In the example shown in FIG. 2A, the attachment element 23 is attached to the external rail 12C, close to a crosspiece (not shown). As a variant, the attachment element 23 is attached both to the external rail 12C and to said crosspiece. The attachment element 23 is arranged so as to receive in translation the second end 21B of the rod.

In the example shown in FIG. 2A, the rod is attached to the hull structure, and mounted so as to be able to slide in an attachment element attached to the floor structure. As a variant, the rod is attached to the floor structure, and mounted so as to be able to slide in an attachment element attached to the hull structure.

Figure 2B:
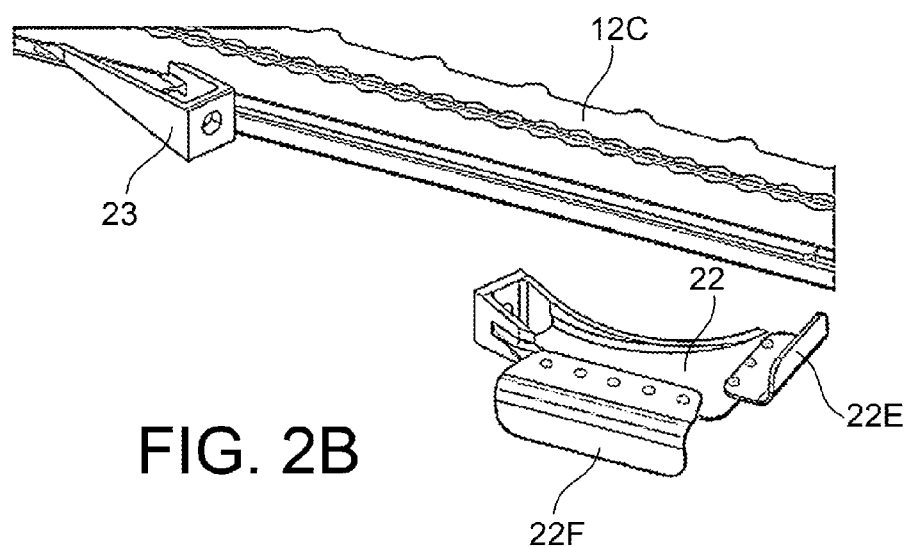
FIGS. 2B and 2C show two details of variants of the embodiment of FIG. 2A.

FIG. 2B shows a detail of an embodiment of an aircraft structure part according to the invention. FIG. 2B shows:

said intermediate component 22, arranged so as to receive said first end of the rod (not shown) and so as to fix it to the hull structure portion (not shown); and the attachment element 23, attached to the floor structure portion, in particular to the rail 12C, and arranged so as to receive in translation the other end of the rod (not shown).

In the example shown in FIG. 2B, the attachment element 23 is similar to the intermediate component 22.

The intermediate component 22 is connected to the hull structure, in particular to the frame 11A and to the skin 11C, via two respective connection components 22F and 22E. A first connection component 22E is attached directly to one among the frame 11A and the skin 11C, and to the intermediate component 22. A second connection component 22F is attached directly to one among the frame 11A and the skin 11C, and to the intermediate component 22. These various attachments are effected by means of rivets.

Figure 2C:
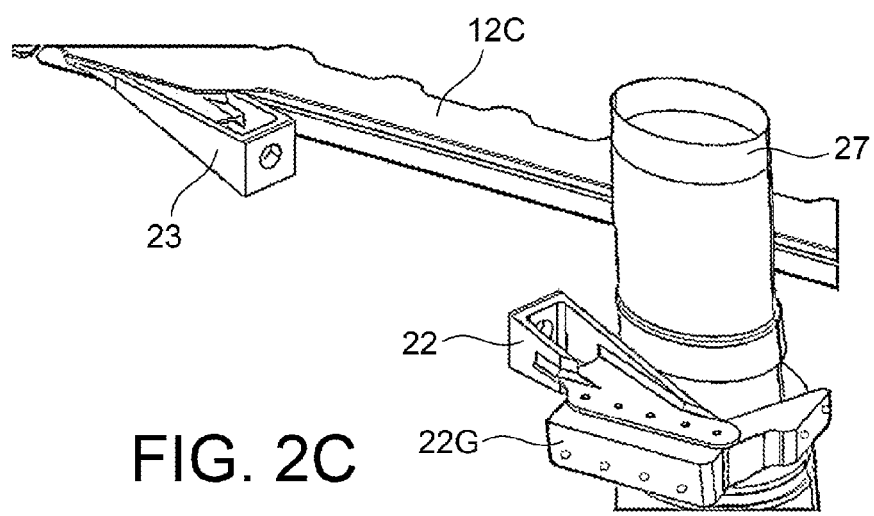

According to one variant shown in FIG. 2C, the two connection components 22E and 22F are replaced by a single connection component 22G, secured both to the frame 11A and to the skin 11C. The single connection component 22G makes it possible to avoid an obstacle such as a conduit 27. The single connection component 22G is attached directly to both the frame 11A and the skin 11C, and to the intermediate component 22. These various attachments are effected by means of rivets.

The end 21A of the rod 21 may also be attached, with the aid of the intermediate component 22, to both the frame 11A and a stringer.

The intermediate component 22 comprises, in particular, a recess receiving the end 21A of the rod, and through holes through which rivets can pass in order to attach the intermediate component 22 to the hull structure (or to a connection component which is itself attached to the hull structure). The intermediate component 22 may be similar to the attachment element, as described below. However, the rod is mounted fixed relative to the intermediate component 22, whereas it is mounted such that it can slide in the attachment element 23.

Figure 2D:
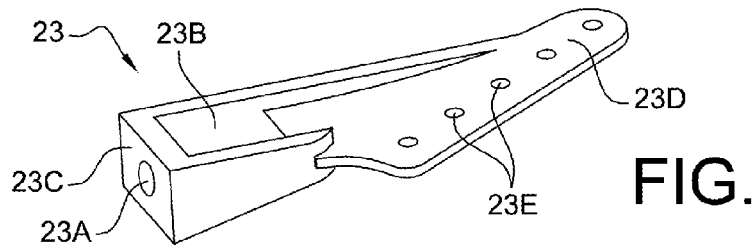
FIGS. 2D to 2G show various detail views of the embodiment of FIG. 2A.

FIG. 2D shows a detail view of the attachment element 23 shown in FIGS. 2B and 2C. There, the attachment element 23 is shown in a perspective view. It comprises an opening 23A, through which the rod 21 can slide, at its second end 21B. The diameter of the opening 23A is slightly greater than the diameter of the rod 21. The sliding of the rod 21 is also termed "translation along its longitudinal axis." The opening is created in a wall 23C of the attachment element. The wall 23C is preferably orthogonal to the longitudinal axis of the rod 21, along which it slides.

An endstop element 24 (see FIGS. 2E and 2F) is attached to the rod 21, at its second end 21B. This endstop element 24 is located, in particular, on the side of the opening 23A opposite the first end 21A of the rod. In other words, the opening 23A is located between the endstop element 24 and the second end 21B of the rod. The endstop element 24 has a cross section in a plane orthogonal to the longitudinal axis of the rod, which projects relative to the extent of the opening 23A considered in the same plane.

The endstop element 24 makes it possible to limit the sliding of the rod in the opening 23A, when the connecting element 20 is subjected to a force which tends to move the attachment element 23 away from the first end 21A of the rod. In particular, when the connecting element 20 is subjected to such a force, the rod slides in the opening 23A until the endstop element 24 comes to abut against the attachment element 23, in particular, against the wall 23C surrounding the opening 23A.

The endstop element 24, the intermediate component 22 and the attachment element 23 may be made of metal (for example aluminum, titanium or steel) or made of composite material.

In the example shown in FIGS. 2A and 2D to 2G, the attachment element 23 comprises a recess 23B, within which the endstop element 24 is guided in translation, when the rod 21 slides through the opening 23A. For example, the recess 23B has internal walls with three faces, these walls together having a U-shaped cross section. In particular, the wall 23C receiving the opening is surrounded by two mutually parallel sidewalls.

This U shape makes it easy to insert the endstop element 24 into the recess 23B, when mounting a connecting element according to the invention. Once the endstop element 24 has been inserted into the recess 23B, the end 21B of the rod is introduced into the recess 23B, by making the rod slide in the opening 23A. Then, the endstop element 24 is fixed close to the end 21B of the rod.

This U shape, in combination with an endstop element 24 having a polygonal cross section, also avoids the rod rotating in the recess 23B. In particular, the endstop element 24 cannot twist within the recess. Such a rotation could weaken the intermediate component 22.

The attachment element 23 also comprises a planar support part 23D, designed to be pressed against the external rail, and attached thereto by rivets mounted in the though holes 23E.

Figure 2E:
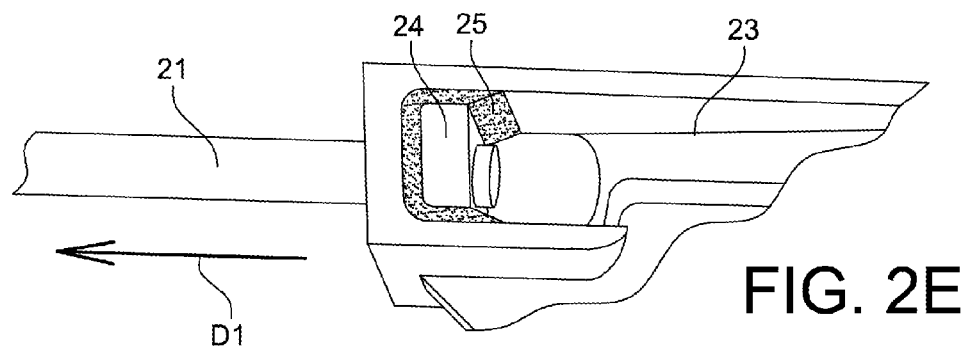

FIG. 2E shows a detail view of FIG. 2A. The endstop element 24 has the shape of a rectangular parallelepiped. The endstop element 24 is for example a nut screwed onto a thread of the rod 21. The thread is for example forged in a section of increased thickness of the rod 21. The recess 23B forms a guide for the endstop element, the guide extending along the longitudinal axis of the rod 21. The rectangular cross section of the endstop element 24 engages with the U-shaped cross section of the internal walls of the recess 23B, for optimum guiding in translation of the endstop element (without twisting).

In the example shown in FIG. 2E, a coating 25 made of elastomeric material is interposed between the internal sidewalls of the recess 23B and external sidewalls of the endstop element 24. The term "side" refers to the longitudinal axis of the rod: a wall connecting two planes orthogonal to this axis is said to be a sidewall. A sidewall extends, in particular, in a plane parallel to the longitudinal axis of the rod. As a variant, a sidewall is a section of a conic, the conic being rotationally symmetric around the longitudinal axis of the rod. In the example shown in FIG. 2E, the coating 25 extends between the first of the two parallel internal walls of the recess, and the external wall of the endstop element located opposite, and between the second of the two parallel internal walls of the recess, and the external wall of the endstop element located opposite.

The elastomeric material is for example a rubber, a polybutadiene, or any other elastomer known to a person skilled in the art. The coating 25 is, for example, adhesively bonded to external sidewalls of the endstop element 24. Thus, when the endstop element 24 moves in the recess 23B, the coating 25 slides against the internal sidewalls of the recess, so as to avoid rubbing of metal against metal. Instead, metal rubs against elastomer. This increases the life of the connecting element according to the invention. According to a variant which is not shown, the coating 25 is adhesively bonded to the internal sidewalls of the recess 23B. When the endstop element 24 moves in the recess 23B, the external sidewalls of the endstop element slide against the coating 25.

In FIG. 2E, the connection between the hull structure and the floor structure is loaded in tension. In other words, the floor structure tends to move away from the hull structure (in a crash situation, for example). The rod slides along its longitudinal axis, and towards the hull structure (see arrow D1), until the endstop element 24 comes to bear against the wall 23C forming the bottom of the recess 23B. Once the endstop element 24 is located bearing in this manner, the rod 21 is prevented from moving in translation along D1. In this position, the connecting element according to the invention satisfies the requirement of withstanding an acceleration of 9 g towards the front of the aircraft. In particular, the rod 21 is dimensioned so as to avoid any failure when it is subjected to such conditions. This condition is ensured in particular by means of an appropriate choice of the diameter of the rod. The rod is dimensioned such that, in normal conditions of use (loading in tension lower than 9 g towards the front of the aircraft), the stresses experienced cause no permanent deformation. In other words, in normal conditions of use, any deformation of the rod is an elastic deformation.

Figure 2F:
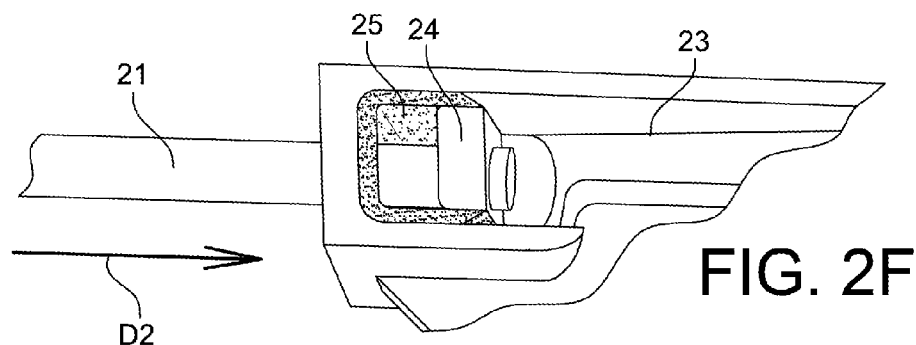

FIG. 2F shows the case in which the connection between the hull structure and the floor structure is loaded in compression. In this case, the rod 21 slides along its longitudinal axis, and towards the floor structure (see arrow D2). This time, the endstop element 24 slides freely in the recess 23B, without its movement being blocked by an obstacle. The depth of the recess 23B is designed for such a free sliding, depending on the expected maximum compressive stresses. For example, it is estimated that the maximum amplitude of the sliding of the endstop element in the recess 23B is 10 mm. One therefore provides a recess of length equal to 15 mm along the longitudinal axis of the rod 21. The recess may have a safety endstop, opposite the wall 23C. In normal flight conditions, the endstop element 24 never reaches this safety endstop.

In the absence of tensile or compressive loading, the endstop element is advantageously located close to the wall 23C receiving the opening 23A, for example 2 mm therefrom. In the event of tensile loading, the endstop element moves away from this opening, for example until it is located 10 mm from the opening 23A. In the event of loading in compression, the endstop element moves closer to and then presses against the wall 23C receiving the opening.

The rod is arranged so as to slide in the opening 23A with a maximum sliding amplitude for example between 6 mm and 15 mm, in particular 10 mm.

The invention is very simple to install and to maintain, the components being easily accessible, and not requiring intensive adjustment or specific tools.

The invention also makes it possible to satisfy the requirements for withstanding vibrations associated with the aeronautical context.

During a flight phase, the endstop element 24 moves numerous times as the aircraft variously shakes. In particular, the endstop element 24 comes to bear multiple times against the wall 23C. Each time, the endstop element 24 impacts against the wall 23C. In addition to reducing the life of the connecting element according to the invention, such an impact creates unpleasant noise. This impact typically corresponds to an acceleration of 6 g towards the front of the aircraft, with a duration of 11 ms, as specified in the standard RTCA-160D.

The coating 25 interposed between external sidewalls of the endstop element 24 and internal sidewalls of the recess 23B helps to damp this impact.

In order to further improve this impact-damping function (and therefore reduce noise), the coating made of elastomeric material also covers the wall 23C of the recess 23B, around the opening 23A.

It is possible to provide a step of calibrating the coating made of elastomeric material (thickness, material), so as to adapt it to limits on impact damping or maximum noise levels.

Preferably, a single layer of elastomeric material extends in the recess 23B, adhesively bonded to the wall 23C on one hand, and on the other hand to two external sidewalls of the endstop element 24, as shown in FIGS. 2E and 2F. In this particular case, since the coating made of elastomeric material is connected on one hand to the recess and on the other hand to the endstop element, it tends to deform as shown in FIGS. 2E and 2F when the endstop element 24 moves relative to the recess 23B.

It is possible to provide a step of calibrating the coating (thickness, material), so as to adapt it to a desired maximum amplitude of the sliding of the rod in the opening 23A.

According to a variant which is not shown, the recess 23B is open, on the side opposite the wall 23C. Even when a compressive force much greater than what could have been foreseen is applied to the connection between the floor structure and the hull structure, the only consequence is a sliding greater than the expected maximum sliding of the rod 21 in the opening 23A. The end 21B of the rod then projects out of the recess 23B, and towards the floor structure. There is no risk of damage to the skin of the hull structure, which is located on the opposite side.

Figure 2G:
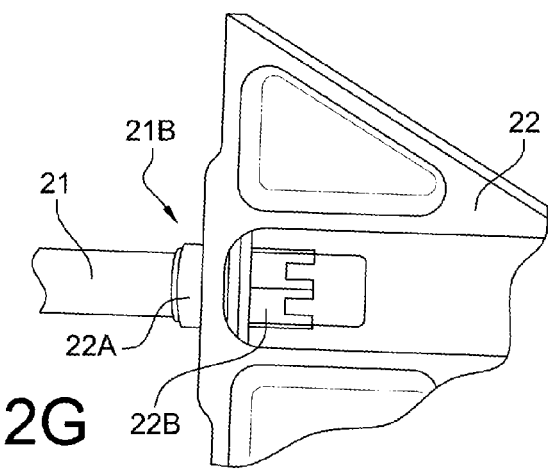

FIG. 2G shows a detail view of the rod 21, at its end 21A. The rod 21 is attached to the intermediate component 22.

As shown in FIGS. 2B and 2C, the intermediate component 22, attached here to the external rail 12C, may be similar to the attachment element 23 such as described with reference to FIG. 2D.

The rod 21 is inserted into a cavity within the intermediate component 22, at its end 21A, and by virtue of an opening created in the intermediate component. Said cavity is for example similar to the recess 23B of the attachment element 23. Said opening in the intermediate component is for example similar to the opening 23A of the attachment element 23.

The rod 21 is held secured to the intermediate component 22 by virtue of two nuts 22A and 22B positioned on either side of the opening in the intermediate component, and screwed onto respective threads of the rod 21. The nut 22B is located within the cavity.

Figure 3A:
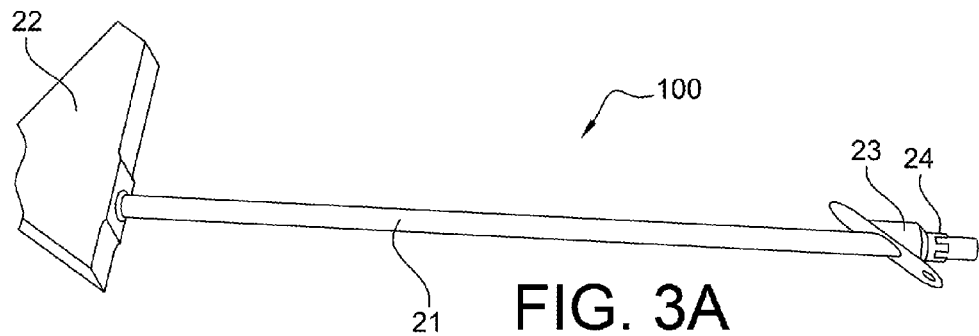
FIG. 3A shows a second embodiment of an aircraft structure part according to the invention.

FIG. 3A shows a second embodiment of an aircraft structure part 100 according to the invention.

According to this variant, the endstop element 24 has a hexagonal cross section, in a plane orthogonal to the longitudinal axis of the rod. The endstop element 24 does not move within a recess. The attachment element 23 forms a guide for the rod 21, but this guide extends from the side of the opening opposite the endstop element 24. This guide is, for example, a cylindrical section of internal diameter slightly greater than the external diameter of the rod. It is therefore particularly easy to mount the endstop element 24 on the rod 21. That part of the attachment element 23 forming a guide for the rod 21 can also be called a "recess."

Figure 3B:
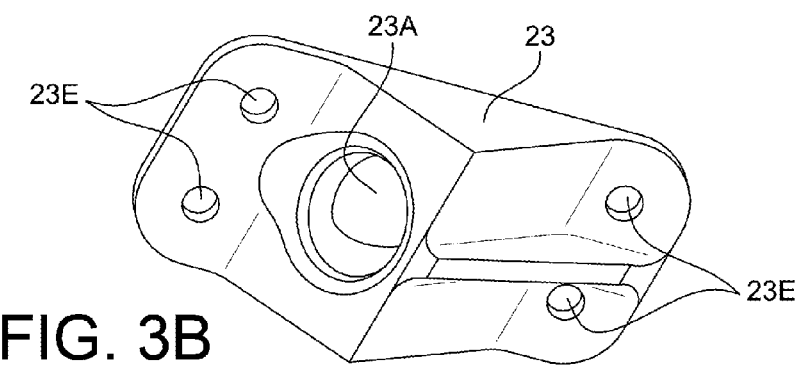
FIG. 3B shows a detail view of the embodiment of FIG. 3A.

FIG. 3B shows a detail view, in perspective, of the attachment element 23 shown in FIG. 3A. The attachment element has an opening 23A as described with reference to FIG. 2D, and through holes 23E for attaching to the external rail by means of rivets.

According to a variant which is not shown, a ring is interposed between the rod 21 and the opening 23A in the attachment element, in order to avoid two like materials rubbing against one another. The ring is, for example, made of aluminum-copper alloy, the rod and the attachment element being made of aluminum. Furthermore, a ring made of Teflon may be provided, on the side of the endstop element coming to bear against the attachment element in the event of loading in tension. This Teflon ring avoids two like materials rubbing against one another, and partially damps an impact of the endstop element against the attachment element. This reduces noise linked to the endstop element impacting against the attachment element, in particular in normal flight conditions. Such impacts typically correspond to an acceleration of 6 g towards the front of the aircraft, as described above with reference to FIGS. 2E and 2F.

Figure 4A:
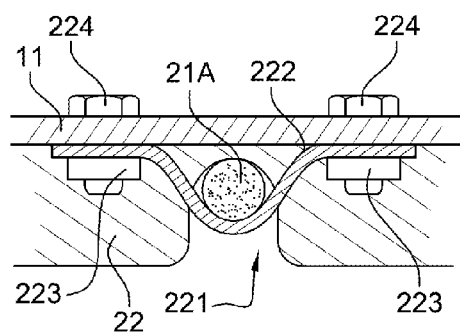
FIGS. 4A and 4B show two variants for attaching a rod according to the invention, on the side of the rod attached to the floor structure or the hull structure.
Figure 4B:
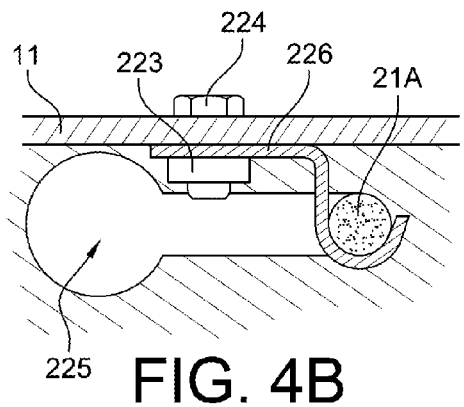

FIGS. 4A and 4B show two variants for attaching a rod, on the side of the rod attached to the floor structure or the hull structure, here the hull structure 11. FIGS. 4A and 4B are views in section in a plane orthogonal to the longitudinal axis of the rod.

In the variant shown in FIG. 4A, the intermediate component 22 comprises an indentation 221 at the bottom of which presses the end 21A of the rod. The bottom of the indentation 221 extends, along an axis parallel to the plane of the hull structure 11 against which the intermediate component 22 presses. The axis of the depth of the indentation 221 extends along an axis orthogonal to the plane of the hull structure 11 against which the intermediate component 22 presses. The rod end 21A is pressed against the bottom of the indentation by a clip 222 which extends over part of the lateral face of the rod, such that the rod is blocked between this clip and the bottom of the indentation. The clip 222 is attached to the hull structure 11, on either side of the rod, by two nuts 223 and two bolts 224.

In the variant shown in FIG. 4B, the intermediate component comprises a cutout or orifice 225. In the view in section of FIG. 4B, the cutout 225 is elongate in a direction orthogonal to the longitudinal axis of the rod, and parallel to the plane of the hull structure 11 against which the intermediate component 22 presses. The end 21A of the rod is inserted into the cutout 225 at a wide part of this cutout. Then, the rod is moved in translation in the cutout, and in the direction of elongation of the latter, to reach a narrowed portion of the cutout. The end 21A of the rod is clamped at the bottom of this narrowed portion of the cutout 225. A clip 226 holds the rod 21 clamped at the bottom of this narrowed portion of the cutout 225. The end 21A of the rod is in contact, over more than half its perimeter, with the bottom of this narrowed portion of the cutout 225. The clip 226 has a first planar portion, bearing against the hull structure 11. A second planar portion, inclined at 90° with respect to the first planar portion, extends towards the rod and passes next to the rod. A third portion of the clip surrounds the rod, on the side opposite the hull structure 11. The clip 226 is attached to the hull structure 11 by a bolt 224 and a nut 223.

A person skilled in the art will be able to imagine numerous other variants for attaching a rod, without departing from the scope of the present invention.

It may be advantageous for the movement of the rod 21 to have not just a single degree of freedom (translation along its longitudinal axis), but also two degrees of freedom in rotation, allowing it to rotate so as to define a cone of apex angle for example less than or equal to 5°. The apex of this cone is located close to the endstop element 24. In order to ensure these additional degrees of freedom, it is merely necessary to make the opening 23A slightly wider than the diameter of the rod. Where necessary, the endstop element is also made slightly narrower than the interior of the recess of the attachment element, this recess forming a guide. Any impacts as a result of this slight play can be damped by virtue of the coating made of elastomeric material such as described with reference to FIGS. 2E and 2F. The invention makes it very easy to obtain these two additional degrees of freedom, with excellent control of the associated maximum amplitudes of movement.

It may be advantageous to retain anti-crash connecting rods according to the prior art at certain points of the structure of an aircraft. Nonetheless, three quarters of these anti-crash connecting rods can be replaced each with a connecting element according to the invention. The mass gain for a whole aircraft is therefore considerable.

It may also be advantageous to replace the rod 21, with multiple parallel rods, each one sliding into a dedicated opening. It is thus possible to mass produce rods which are all identical. The same rods are then used for all aircraft models, whatever the mass of the floor structure and of that which the latter will be used to support (seats, passengers, baggage, etc.). It is arranging multiple rods in parallel that makes it possible to withstand an acceleration of 9 g towards the front of the aircraft, whatever the mass experiencing this acceleration.

There follows an illustration, with reference to FIGS. 5A to 5F, of a method according to the invention, for manufacturing a rod 21 made of composite material.

FIG. 5A shows, schematically, the principle of the method according to the invention. According to this method, two spacers 50 are arranged at a distance from one another. Then, fibers are arranged extending from one spacer to the other, covering these, to form a bundle of fibers 221 extending along the axis D3. At each end of the bundle of fibers, a spacer 50 is placed at the center of the bundle of fibers. The spacer 50, called an olive, has an oblong shape, elongate along the axis D3, and is axisymmetric about this axis. Then, a clamping component 51 which holds the fibers against the spacer 50 is placed at each end of the bundle of fibers 221. The clamping component 51 extends at least partly around the spacer 50. The arrangement thus produced, shown in FIG. 5A, represents a solution which is both simple and effective for holding the fibers clamped against one another in a cylindrical bundle of fibers.

The bundle of fibers is then impregnated with resin, then the resin is polymerized. This produces a rod made of composite material with at each end the spacer and the clamping component. It is possible to cut off the ends of the rod to obtain a cylindrical component.

FIG. 5B shows a view in section of a particular embodiment of an arrangement according to the invention. FIG. 5B is a detail view of one of the ends of the bundle of fibers. Once the fibers have been passed either side of the spacer 50, the fibers are held against the spacer by a clamping collar 501. A rigid bar 502 passes through the spacer 50. The rigid bar 502 is mounted fixed in the spacer 50, and projects on either side thereof, between the clamping collar 501 and the other end of the bundle of fibers. Once the fibers have been positioned, the rigid bar 502 still projects on each side, out of the bundle of fibers. A clamping component, formed by a steel ring 503, comes to bear against those portions of the rigid bar 502 which project out of the spacer and of the bundle of fibers. The internal diameter of the ring 503 decreases with increasing distance from the rigid bar 502. The ring 503 is pressed against the rigid bar 502 by two cleats 504.

FIG. 5C is a view in section of the device of FIG. 5B, in a plane orthogonal to the axis of the bundle of fibers passing through the rigid bar 502. FIG. 5C makes it possible, in particular, to illustrate the flutes 506 created on the external surface of the spacer 50. The flutes 506 make it possible to twist the fibers clamped between the spacer 50 and the ring 503. This results in a bundle of fibers which are twisted around the axis D3, starting from a bundle of parallel fibers. The fibers are only slightly twisted (one turn every 50 mm to 100 mm of length of the bundle of fibers). The twists allow, in particular, better placement of the polymerization tools. Furthermore, this limits any elongation of the rod obtained in this manner when it is loaded in tension.

It is possible to provide that the spacer has an oblong shape of revolution which is truncated on the side opposite the bundle of fibers. The truncated face has a slot for receiving a tool which will turn the spacer. Turning the spacer makes it possible to twist the fibers engaged in the flutes 506.

FIG. 5D is a view in section of the device of FIG. 5B, in a plane orthogonal to the axis of the bundle of fibers passing through the clamping collar 501. FIG. 5C makes it possible in particular to illustrate this clamping collar, having means 507 for adjusting its diameter, in order to clamp the fibers as close to the spacer 50 as possible.

FIG. 5E is a schematic representation of the polymerization step. The bundle of fibers 221 impregnated with resin, held at its two ends as described with reference to FIG. 5B, is placed inside a compression envelope 52. This compression envelope is placed, with its contents, in an autoclave designed for effecting an industrial reaction under pressure. In this example, the resin is, for example, a thermosetting resin polymerized by compression. After polymerization, the cleats are removed, then the ends of the rod are cut off, for example, along a plane passing through the steel ring and the spacer.

FIG. 5F is a view in section, in a plane orthogonal to the longitudinal axis of the bundle of fibers, of an installation for simultaneously manufacturing multiple rods using the method according to the invention. Multiple bundles of fibers are arranged such that they are mutually coplanar and parallel. In this example, a single cleat 504 is provided per bundle of fibers, instead of the two cleats represented in FIG. 5B. The cleats are placed in rows, next to one another. They are stabilized against one another, for example bearing against respective flat surfaces, or assembled by means of a tongue-and-groove connection (see FIG. 5F). The assembly formed by the multiple bundles of fibers, the spacers, cleats, rings, clamping collars and respective rigid bars, is placed in a single compression envelope 52.

According to a variant which is not shown, on each side of the bundles of fibers, the ends of the bundles of fibers are held by means of several lateral cleats. An upper cleat and a lower cleat, common to all the bundles of fibers, both extend transversely to the latter. Lateral cleats extend in particular between two adjacent bundles of fibers.

The method according to the invention provides a shrewd solution for manufacturing a rod 21 made of composite material. It permits mass production at reduced cost and with reduced manufacturing time.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft structure part comprising:
a floor structure portion,
a hull structure portion, and
a connecting element, wherein the connecting element comprises:
a rod having a longitudinal axis fixed, at a first end, relative to one of the hull structure portion and the floor structure portion;
an attachment element, attached to an other of the hull structure portion and the floor structure portion, and provided with an opening in which a second end of the rod is mounted such that the rod can slide within the attachment element along the longitudinal axis when the first end of the rod is fixed; and an endstop element attached to the rod, arranged so as to engage with the attachment element when the hull structure portion tends to move away from the floor structure portion, so as to limit the sliding amplitude of the rod in the opening.

2. The structure part according to claim 1, wherein the rod is attached, at its first end, to the hull structure portion, and wherein the attachment element is attached to the floor structure portion.

3. The structure part according to claim 2, wherein the attachment element is attached to an external rail of the floor structure portion.

4. The structure part according to claim 2, wherein the rod is attached to a frame and a skin of the hull structure portion.

5. The structure part according to claim 1, wherein the endstop element is a nut screwed around the rod.

6. The structure part according to claim 1, wherein the endstop element has a rectangular cross section, in a plane orthogonal to the longitudinal axis of the rod.

7. The structure part according to claim 1, wherein the attachment element comprises a recess in which is created the opening and which receives the endstop element, the endstop element being guided in translation within the recess when the rod slides through the opening.

8. The structure part according to claim 7, wherein the recess has an internal wall with a U-shaped cross section.

9. The structure part according to claim 7, wherein a coating made of elastomeric material, attached to internal sidewalls of the recess or to external sidewalls of the endstop element.

10. The structure part according to claim 7, wherein a coating made of elastomeric material extends in a plane orthogonal to the longitudinal axis of the rod, on an internal wall of the recess which surrounds the opening.

11. The structure part according to claim 1, wherein the attachment element extends in its entirety between the first end of the rod and the endstop element.

12. The structure part according to claim 1, wherein the rod is inserted, at its first end, into an opening created in an intermediate component attached to one among the hull structure portion and the floor structure portion, the rod being held secured to the intermediate component by two nuts positioned around the rod on either side of said opening in the intermediate component.

13. The structure part according to claim 1, wherein the first end of the rod is pressed against the bottom of an indentation in an intermediate component, by a clip extending transversely to the rod, the clip being attached on either side of the rod to one of the hull structure portion and the floor structure portion.

14. The structure part according to claim 1, wherein the first end of the rod is pressed against an internal face of an orifice created in an intermediate component, by a clip extending transversely to the rod, the clip being attached on just one side of the rod to one of the hull structure portion and the floor structure portion.

* * * * *